United States Patent [19]

Lakomsky et al.

[11] 4,133,987
[45] Jan. 9, 1979

[54] ELECTRODE ASSEMBLY FOR PLASMA ARC TORCHES

[75] Inventors: Viktor I. Lakomsky, Zaporozhie; Georgy M. Grigorenko, Kiev; Gennady F. Torkhov, Kiev; Gary A. Melnik, Kiev; Vitaly S. Nesmikh, Kiev, all of U.S.S.R.

[73] Assignee: Institut Elektrosvarki Imeni E.O. Patona Adakemii Nauk, Kiev, U.S.S.R.

[21] Appl. No.: 858,242

[22] Filed: Dec. 7, 1977

[51] Int. Cl.² .............................................. B23K 9/00
[52] U.S. Cl. ............................................... 219/121 P
[58] Field of Search .................. 219/85 CW, 85 N, 94, 219/118, 121 P

[56] References Cited

U.S. PATENT DOCUMENTS

| | | | |
|---|---|---|---|
| 2,937,262 | 5/1960 | Baxter | 219/118 X |
| 3,546,422 | 12/1975 | Bykhovsky et al. | 219/121 P |
| 3,930,139 | 12/1975 | Bykhovsky et al. | 219/121 P |
| 3,944,778 | 3/1976 | Bykhovsky et al. | 219/121 P |

*Primary Examiner*—J. V. Truhe
*Assistant Examiner*—Fred E. Bell
*Attorney, Agent, or Firm*—Burgess, Ryan and Wayne

[57] ABSTRACT

In a plasma-arc torch for melting metals the electrode assembly comprises an electrode holder made of copper alloys and having a butt portion which rigidly secures a tungsten electrode by means of diffusion welding. The invention provides for a welded joint between the electrode and the electrode holder, a nonconsumable current-conducting interlayer made of titanium, copper and tungsten being placed therebetween.

3 Claims, 2 Drawing Figures

ELECTRODE ASSEMBLY FOR PLASMA ARC TORCHES

The present invention relates to equipment for plasma-arc working of metals and more particularly to electrode assemblies for plasma-arc torches.

The invention is especially suitable for melting metals and alloys in order to improve quality.

BACKGROUND OF INVENTION

There are known plasma-arc torches comprising each a body, a nozzle, an electrode holder carrying a central electrode, and means for supplying electric current, water and gas.

Tungsten is the most suitable material for the electrode of such a plasma-arc torch which utilizes straight- or reverse-polarity operating mode and has its electrode surrounded by inert or neutral gases.

In these plasma arc torches, maximum permissible currents depend on the rate of electrode cooling. In the case of straight-polarity operating mode (with the tungsten electrode used as a cathode) the cathode is heated relatively weakly. Therefore, at working currents of several hundreds of amperes, conventional grips disposed in a water cooled electrode holder are adequate.

However, grips are mainly used in low-powered plasma-arc torches utilizing monatomic gases as the working medium. This is due to the fact that the linear contact between the grip and the electrode, and between the grip and the water-cooled electrode holder, provides a relatively high electrical and heat resistance with the result that the grip cannot resist large electrical and thermal loads.

A high thermal resistance leads to intensive heating of both the grip and the electrode; this occurs at currents exceeding 1000 A and results in excessive wear of the electrode.

The heating of the grip also deteriorates its mechanical strength and disturbs contact between the electrode, the grip and the water-cooled electrode holder. This, in turn, leads to an increase in the electrical and thermal resistance of the grip and to further heating of all its parts, and, finally, the grip fails.

In addition, insufficient cooling of the grip does not allow for a decrease in the ratio of the free portion of the electrode to its diameter, which can bring the working surface of the electrode close to the water-cooled electrode holder. The ratio $l/d$ is a critical design parameter of the plasma-arc torch, responsible for the intensity of cooling of the electrode working surface, where $l$ is the electrode length, and $d$ is the electrode diameter. It will be appreciated that the smaller the value of this ratio, the greater will be the cooling of the working surface of the electrode and the smaller the wear of the electrode. In the known plasma-arc torches with grips, minimum ratio $l/d$ is $\frac{1}{2}$. At smaller values of this ratio, the grip melts off.

The use of the nitrogen-hydrogen mixture as the working medium and application of higher currents requires that the electrode be cooled intensively. For this, use is made of tungsten electrodes soldered in a water-cooled electrode holder made of copper. An electrode assembly with soldered-in electrodes allows the electrode to be cooled much more intensively with the result that lesser wear of the electrode takes place owing to a relatively good contact between the surfaces of the electrode and the electrode holder. In addition, such a construction permits the working surface of the electrode to be close to the cooling area so that the ratio $l/d$ is decreased due to intensive cooling of the electrode holder.

However, the construction with soldered-in electrodes is disadvantageous since solders are maintained here at a relatively low melting temperature of 300 to 1200° C. and include elements featuring a higher vapour pressure. This does not allow the ratio $l/d$ to drop off down to the required value as otherwise the elements of a solder having a higher vapour pressure evaporate selectively and the joint between the cathode and the electrode holder is not, therefore, reliable and fully sealed. Apart from this, in the area where the electrode is soldered to the electrode holder (whatever solder is used) there results a brittle intermetallic compound with the result that the joint features a considerable brittleness and low mechanical strength, and cracks often appear in the soldering area due to thermal shocks.

There are also known electrode assemblies having pressed-on or screwed-in electrodes, in which the above-described disadvantages of their predecessors have been eliminated to some extent.

In the case of pressed-on electrodes, for example, the difference between the linear expansion coefficients of the materials of the electrode and the electrode holder results in the deterioration of the mechanical strength of the pressed-on connection and in poor contact between the electrode and the electrode holder each time they are heated. Also the tightness of the water-coolant passages of such electrode assemblies become worse, while the surfaces of the pressed-on connection are constantly subject to natural oxidation which leads to poor electrical and thermal conduction at the joint between the electrode and the electrode holder. In the case of screwed-in electrodes, similar disadvantages are obviously encountered.

Thus, the known electrode assemblies cannot utilize currents that considerably exceed permissible limits. In the case of straight-polarity operating mode, such currents result in low operational effectiveness, while in the case of reverse-polarity operating mode, inadequate heat transfer conditions are observed which do not allow for the use of tungsten electrodes since they are heated to a temperature which is 8 to 10 times that noted in straight-polarity applications.

There is an electrode assembly for plasma-arc torches (cf. British Pat. No. 1,402,199), comprising an electrode holder made of copper or copper alloys and having a butt portion which rigidly secures a tungsten electrode. This attachment is accomplished as follows. The electrode is immersed in the molten metal, for example, copper or a copper alloy, from which the electrode holder is to be made. Prior to immersing the electrode in the molten pool, they are coupled to a d.c. circuit to strike an arc therebetween. An extended contact between tungsten and copper is provided so that the electrode is given a shape which ensures good heat exchange.

However, the mechanical strength of the joint between the electrode and the electrode holder is insufficient in the presence of high electrical and thermal loads. Since tungsten is insoluble in the molten copper (cf. M. Hansen, Constitution of Binary Alloys, Second Edition prepared with the cooperation of Kurt Anderko, McGraw-Hill Book Company, Inc., New York-Toronto-London, 1958, p. 649) there is no bonding at the joint between the electrode and the electrode holder. In operation, the electrode assembly is subject to considerable thermal shocks causing the extension of the metals from which the electrode and the electrode holder are made. Due to the difference between the linear extension coefficients of copper and tungsten, their joint is destroyed so that clearances appear, the metals oxidize and electrical and thermal conduction deteriorate, which leads to further destruction of the joint. As a result, the actual life of the electrode assembly is reduced. When plasma-arc torches are used for metal cutting and when a limited number of switching-ons (say, 20) is employed, the above-described disadvantages do not considerably affect the actual life of the electrode assembly. In the case of metal-melting applications, however, plasma-arc torches may operate 1000 hours and more, which requires that the metals of the electrode and the electrode holder be jointed reliably.

BRIEF DESCRIPTION OF THE INVENTION

An object of the present invention resides in the provision of an electrode assembly for plasma-arc torches, provided with a reliable joint between the electrode and the electrode holder and with higher thermal and electric conduction.

A further object of the present invention resides in the provision of an electrode assembly for plasma-arc torches, provided with a joint between the electrode and the electrode holder which can resist thermal shocks.

Still another object of the present invention is to provide an electrode assembly for plasma-arc torches, which can provide for increased heat removal from the working surface of the tungsten electrode.

SUMMARY OF THE INVENTION

With these and other objects in view, there is proposed an electrode assembly for plasma-arc torches, comprising an electrode holder made of copper or copper alloys and a tungsten electrode rigidly secured to a butt portion thereof, the tungsten electrode and the electrode holder, according to the invention, being connected to each other using a nonconsumable current-conducting interlayer made of titanium, copper and tungsten.

According to the present invention there is proposed an electrode assembly for plasma-arc torches, comprising an electrode holder made of copper or copper alloys and a tungsten electrode rigidly secured to a butt portion thereof, the tungsten electrode and the electrode holder being connected to each other using a nonconsumable current-conducting interlayer made of titanium copper and tungsten.

The presence of the nonconsumable current-conducting interlayer placed between the tungsten electrode and the copper electrode holder and containing the metals of the two parts of the electrode assembly of the invention and titan as well, provides for a reliable "copper-tungsten" joint whose transfer characteristics such as thermal and electrical conduction are smooth to allow the joint to resist thermal shocks effectively.

Due to the reliability of the "copper-tungsten" joint, the electrode assembly of the invention can utilize an electrode having its length shorter than its diameter.

The nonconsumable current-conducting interlayer between the metals of the electrode and the electrode holder is preferably formed by means of diffusion welding, a tungsten foil being placed therebetween.

BRIEF DESCRIPTION OF THE DRAWINGS

Other features and advantages of the invention will appear from the following detailed description of a preferred embodiment thereof with reference to the accompanying drawings in which.

DETAILED DESCRIPTION OF A PREFERRED EMBODIMENT

Figure 1:
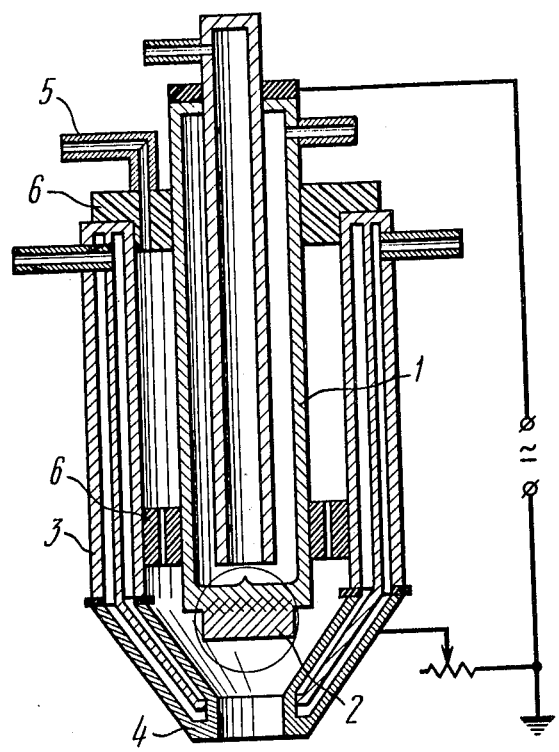
FIG. 1 is a schematic view of a plasma arc torch incorporating an electrode assembly, according to the invention.

Referring to FIG. 1, an electrode assembly of the invention comprises a water-cooled electrode holder 1 made of copper or copper alloys and provided with a butt portion which rigidly secures a tungsten electrode 2 with heat-emitting additions. In the embodiment, the electrode assembly is used, by way of example, in a plasma-arc torch comprising a water-cooled body 3 whose lower portion mounts a nozzle 4 and whose upper portion carries a gas-supplying means 5. The electrode holder 1 is installed in the body 3 and insulated therefrom by means of insulators 6.

Figure 2:
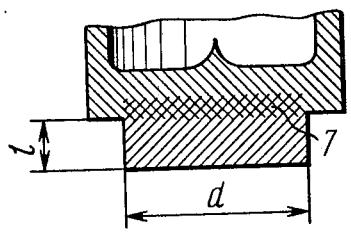
FIG. 2 is an enlarged schematic view of the electrode assembly, according to the invention.

The electrode assembly of the invention, illustrated in greater detail in FIG. 2, comprises a nonconsumable current-conducting interlayer 7 which is formed by means of diffusion welding using the materials of the electrode holder and the electrode, a titanium foil made of copper, titanium and tungsten being placed therebetween.

With reference of FIGS. 1 and 2, the electrode 2 is shown which has its length shorter than its diameter, while the diameter of the electrode holder is greater than that of the electrode 2.

In operation, the plasma-generating gas is directed to the electrode 2 in the vicinity of the nozzle 4. As a result, an arc plasma is struck. The butt portion of the electrode 2 warms up while its side surface remains cool due to intensive heat removal from the electrode 2, provided by the interlayer 7 and a small length of the electrode.

Since the plasma-generating gas acts on the side surface of the electrode 2 at a low temperature, that side is protected from chemical destruction.

The interlayer 7, made from tungsten, copper and titanium and formed by means of diffusion welding, provides the joint between the electrode 2 and electrode holder 1 with a higher mechanical strength and resistance to thermal shocks even though the length of the electrode is small.

A 50-kW plasma arc-torch provided with the proposed electrode assembly has been tested using a plasma arc furnace with a crystallizer. Melts were carried out in pure nitrogen atmosphere; current and voltage values of 400 A and 110 V, respectively, were used. The test results are as follows: no destruction of the side surface of the electrode is observed; the mass of the electrode does not lessen; and the mechanical strength of the joint between the tungsten electrode and the copper electrode is not affected by multiple striking of an arc plasm.

The description of the preferred embodiment of the invention shows that the foregoing and other objects and advantages of the invention are achieved using the proposed electrode assembly.

Although the present invention has been described with reference to a single illustrative embodiment thereof, it should be understood that numerous other modifications and embodiments can be devised by those skilled in the art that will fall within the spirit and scope of the principles of the present invention.

What is claimed is:

1. An electrode assembly for plasma-arc torches, comprising an electrode holder made of copper or copper alloys and a tungsten electrode rigidly secured to a butt portion thereof, the tungsten electrode and the electrode holder being connected to each other using a current-conducting interlayer made of titanium, copper and tungsten.

2. An electrode assembly according to claim 1, wherein the length of the electrode (2) is less than its diameter.

3. An electrode assembly according to claim 1, wherein the nonconsumable current-conducting interlayer is formed by means of diffusion welding, a titanium foil being placed between the tungsten electrode and the electrode holder.

UNITED STATES PATENT OFFICE
CERTIFICATE OF CORRECTION

Patent No. 4,133,987    Dated January 9, 1979

Inventor(s) Viktor I. Lakomsky, et al

It is certified that error appears in the above-identified patent and that said Letters Patent are hereby corrected as shown below:

Column 3, line 58: "titan" should be --titanium--

Column 4, line 62: "plasm" should be --plasma--

Signed and Sealed this

Twenty-eighth Day of August 1979

[SEAL]

Attest:

Attesting Officer

LUTRELLE F. PARKER
Acting Commissioner of Patents and Trademarks